May 3, 1966  C. L. LOVERCHECK  3,248,862
AIR DRIER
Filed Feb. 18, 1963
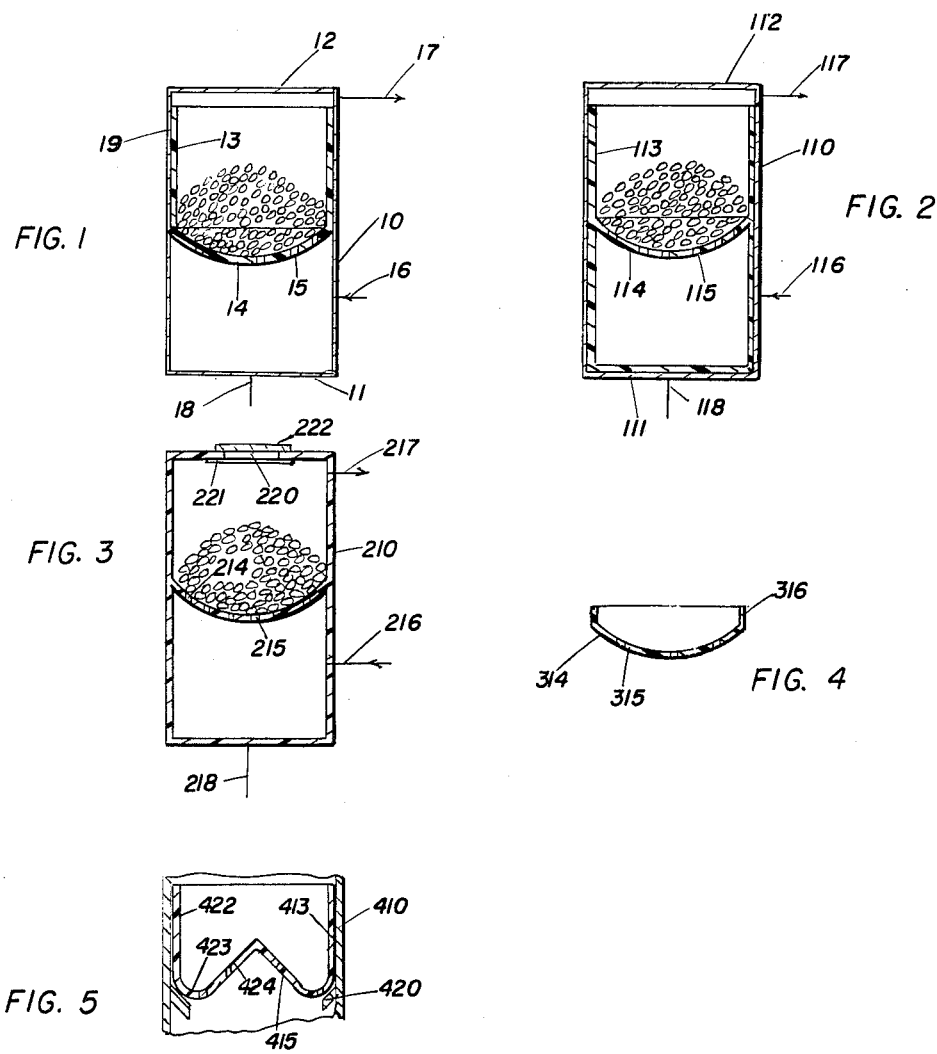
INVENTOR.
CHARLES L. LOVERCHECK 3,248,862
AIR DRIER
Charles L. Lovercheck, 632 W. 7th St., Erie, Pa.
Filed Feb. 18, 1963, Ser. No. 259,078
4 Claims. (Cl. 55—388)

This invention relates to air driers.

In driers of this type, a tank is provided with an inlet and an outlet and a partition therebetween. A soluble desiccating material having hygroscopic properties is supported on this partition and as air enters the bottom of the tank and goes up through the desiccant, the moisture entrained in the air combines with the desiccant and forms a solution which collects in the bottom of the drier to be drawn off. The desiccants frequently used are highly corrosive to the steel tanks which are universally used for this type of drier and a terrific corrosion problem is experienced, especially at the point where the partition is welded into the tank. Many steel tanks fail at this point within a few years of service.

It is, accordingly, an object of this invention to provide a desiccating tank for a deliquescent type air drier which is free of corrosion problems.

Another object of the invention is to provide an improved desiccant tank.

Still another object of the invention is to provide an improved air drier.

A further object of the invention is to provide an air drier wherein the support in the air drier is not welded to the steel tank and is made of a material which is completely inert to corrosive desiccating materials.

Yet a further object of the invention is to provide an air drier which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a longitudinal cross sectional view of an air drier tank according to the invention;

FIG. 2 is a cross sectional view of another embodiment of the invention;

FIG. 3 is a view of yet another embodiment of the invention;

FIG. 4 is a view of a partition constituting another embodiment of the invention for use in a tank similar to FIGS. 1 and 2; and FIG. 5 is a partial longitudinal cross sectional view of an apertured partition to be used in an air drier.

Now with more particular reference to the drawing, the air drier shown in FIG. 1 has a generally cylindrical tank 10 with a closed bottom 11 and a closed top 12. The top 12 can be provided with a suitable opening with removable cover for inserting additional desiccating material.

A partitioned desiccant container 13 is provided. This desiccating container has a cylindrical upper portion terminating in an apertured bottom portion 14 which forms a partition in the tank. Apertures 15 of the bottom are spaced inwardly from the outside edges so that the solution which finds its way down from the desiccant bed in the container 13 will not drain down the sides of the tank but will run toward the center.

An air inlet 16 and an air outlet 17 of suitable size pipe are provided which can be connected to a compressed air line. The dessicant and water solution collecting in the bottom part of the tank can be drained out through a drain line 18.

The desiccant container 13 could be made of a thermosetting plastic material such as a polyester or an epoxy with fiberglass fibers impregnated in an epoxy resin of the type commonly utilized to make boats and the like. The cylindrical portion of the desiccant container 13 can be bonded to the tank 10 at 19 by means of a suitable adhesive or the like. Therefore, no welding is needed inside the tank. The desiccant container 13 can be put in the tank and bonded in place before the top 12 is welded in place by means of an adhesive such as any of the well known epoxy glues.

In the embodiment of the invention shown in FIG. 2, an air drier similar to that shown in FIG. 1 is shown excepting that a complete integral liner open at its top is made of the thermoplastic material. A tank 110 is preferably generally cylindrical as in FIG. 1 and may be made of a mild steel material which has an inlet 116 and an outlet 117 with a drain line 118. The tank 110 is closed at the top at 112 and at the bottom at 111.

An apertured partition 114 is integrally attached intermediate the upper and lower ends of the liner and this partition may be integrally fabricated inside a container 113 during the time that it is being manufactured and while the epoxy resin is still wet. The partition 114 is concave from a downward direction so that when the desiccant material goes into solution in water, it runs toward the center of the partition. Air entering the holes in the partition will pass up through the desiccant bed resting thereon.

In the embodiment of the invention shown in FIG. 3, an integral tank 210 is shown suitable for use outside a steel tank. The device is made of a fiberglass impregnated epoxy or other suitable thermosetting material having suitable tensile strength properties to withstand the working pressure of air to be used.

The tank 210 has an apertured partition 214 therein which may be put in concave downward as shown or it could be reversed so it would be concave upward. This is also true in the embodiment shown in FIGS. 1 and 2. In either of the embodiments shown in FIGS. 2 and 3, since the entire walls of the tank that would be exposed to desiccant are inert, it will not matter if the solution runs down the sides of the liner or not.

An opening 220 is provided at the top for charging. It has a metal ring 221 on the inside with a metal cover plate 222 above which may be held to the ring by means of threaded studs or the like. Both the ring and the cover plate could have a hole therethrough and a suitable quick removable cover used to close the top. The air drier has an air inlet 216 and an outlet 217 with a drain line 218.

It will be seen that the air drier shown in FIG. 3 is made of material that is completely inert to chemical action of any ordinary desiccating material. If some particular desiccating materials which would react with any particular thermosetting plastic are to be used as a desiccant, then a thermosetting material should be chosen which would not be reactive with such desiccant materials. The salts such as sodium chloride and calcium chloride will usually not be a problem with epoxys and polyesters.

The embodiment of the invention shown in FIG. 4 discloses a partition 314 for use in a desiccating tank such as shown in FIGS. 1, 2, or 3. This partition can either be used with a concave side toward the outlet or the concave side toward the inlet. It has apertures 315 therein and flanges 316 which taper slightly outwardly and upwardly so that the flange thereof will form a sliding fit with the inside of the tank in which it is to be used. The rim or flange of this partition can be bonded in place by a suitable adhesive or it could be supported by lugs such as in the embodiment shown in FIG. 5.

In the embodiment shown in FIG. 5, a tank 410 is generally cylindrical and has spaced inwardly extending lugs 420 therein. These lugs underlie the lower periphery of a desiccant container 413.

The desiccant container 413 has generally cylindrical sides 422 which terminate at the bottom in an arcuate channel 423 and the center is conical at 424 so that when desiccant is supported therein, it will be forced toward the sides of the desiccant container.

Apertures 415 are formed through the desiccant container 413 which allow air to flow from below the container to the point above. The spaced lugs 420 are bonded or welded to the tank walls and support the container in position.

The partitions of FIGS. 1, 4, or 5 may either be bonded to the tank walls or they may be supported on lugs as in FIG. 5.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. An air drier comprising
   an enclosed tank having an inlet for compressed air spaced from the bottom end and an outlet for said air adjacent the other end,
   an apertured, generally horizontally extending partition between said inlet and said outlet,
   means supporting said partition in the walls of said tank,
   deliquescent, hygroscopic material in said tank,
   said partition supporting said hygroscopic material which hygroscopic material is corrosive relative to the material of said tank,
   said partition being made of a thermosetting plastic material having the property of being substantially inert with regard to said hygroscopic material,
   cylindrical flange means integrally attached to the outer periphery of said partition and extending upwardly therefrom generally coextensive with the inside surface of said tank and adapted to form a container for said hygroscopic material therein whereby said hygroscopic material is kept out of contact with said tank,
   and means in the bottom of said tank to remove condensed moisture removed from said air passing through said tank by said hygroscopic material.

2. The air drier recited in claim 1 wherein said partition is concave when viewed from the top of said drier.

3. The drier recited in claim 1 wherein said sides of said flange means are bonded to the inside walls of said tank by means of an adhesive.

4. The drier recited in claim 3 wherein said partition is supported on lugs welded to the inside of said tank.

References Cited by the Examiner

UNITED STATES PATENTS

| | | | |
|---|---|---|---|
| 199,577 | 1/1878 | Rohde | 55—90 |
| 2,642,951 | 6/1953 | Norton | 55—316 X |
| 3,050,920 | 8/1962 | Norton | 55—221 X |
| 3,081,905 | 3/1963 | Schulze et al. | 220—63 |
| 3,098,578 | 7/1963 | Rudelick | 220—63 X |
| 3,135,592 | 6/1964 | Fairs et al. | 55—233 |

REUBEN FRIEDMAN, *Primary Examiner.*

J. ADEE, L. H. McCARTER, *Assistant Examiners.*